UNITED STATES PATENT OFFICE.

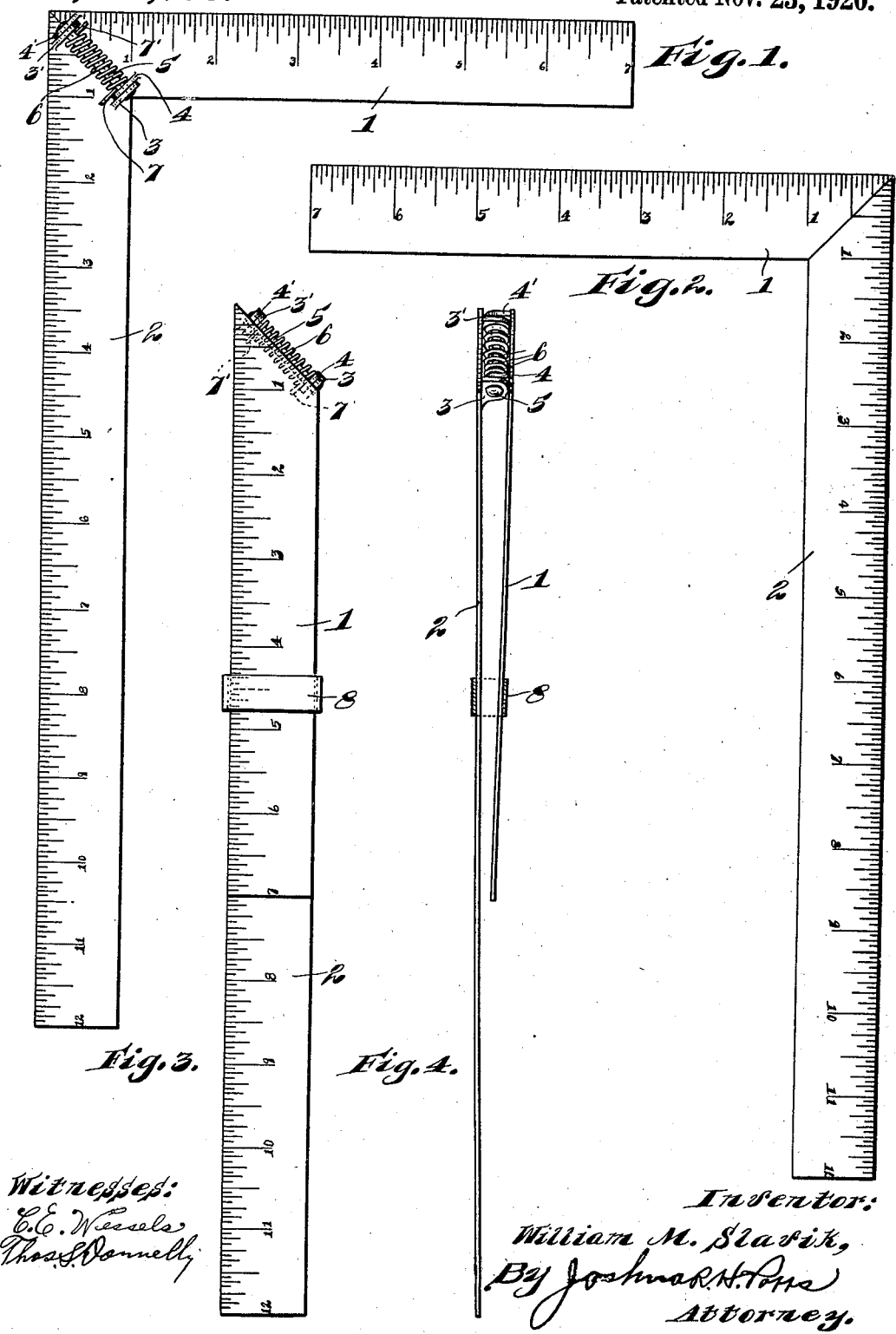

WILLIAM M. SLAVIK, OF OAK PARK, ILLINOIS.

MECHANIC'S SQUARE.

1,359,758.  Specification of Letters Patent.  Patented Nov. 23, 1920.

Application filed March 10, 1919. Serial No. 281,802.

*To all whom it may concern:*

Be it known that I, WILLIAM M. SLAVIK, a citizen of the United States, and a resident of the city of Oak Park, county of Cook, and State of Illinois, have invented certain new and useful Improvements in Mechanics' Squares, of which the following is a specification.

My invention relates to improvements in mechanics' squares, and has for its object the provision of a device which is adapted to be folded, easy to carry and economical in manufacture. A further object is to provide a folding mechanic's square which will be efficient in use and of a rigid and durable construction.

Other objects will appear hereinafter.

The invention consists in the combinations and arrangements of parts hereinafter described and claimed.

The invention will be best understood by reference to the accompanying drawings forming a part of this specification, and in which, Figure 1, is a top plan view of the device, Fig. 2, a view of the reverse side of Fig. 1, Fig. 3, a top plan view of the device folded, and Fig. 4, a side view of Fig. 3.

The preferred form of construction, as illustrated in the drawings, comprising a mechanic's square having two rules 1 and 2 disposed at right angles to each other. The members 1 and 2 are diagonally cut at one end to insure the proper connection of said members, as shown in Fig. 2. Projecting from the member 1, adjacent the diagonally cut edge thereof, are lugs 4 and 4' adapted to receive a pin 5. Similarly, on the member 2 adjacent the diagonally cut edge thereof, are projecting lugs 3 and 3' adapted for the same use as the lugs on member 1. Projecting through said lugs is a pin 5 riveted at both ends and thus connecting the members 1 and 2 together at right angles, at their diagonally cut edges. Loosely engaging said member 5 is a spiral spring 6 having the ends 7 and 7' straightened out so as to lie in contact with the members 2 and 1.

The construction is such that by securely riveting the member 5, the members 1 and 2 are rigidly secured together at their diagonally cut edges, said members 1 and 2 being at right angles to each other. The spiral spring 6 is so positioned that by coöperating with the members 1 and 2, through the members 7' and 7, the members 1 and 2 are held at right angles to each other. The pivotal connection which is afforded through the use of the members 3, 3', 4, 4' and 5 is such as to allow the members 1 and 2 to be folded upon each other, as shown in Figs. 3 and 4. The means for retaining said members 1 and 2 in the folded position consists of a band 8, which is adapted to slide over the ends of the said members when in folded position and engage said members to retain them in said folded position, as clearly seen in Fig. 4.

In devices of this nature it has been found very inconvenient to carry the same because of the fact that the members are disposed at right angles to each other. Especially is it inconvenient to place devices of this nature, not embodying the applicant's invention, in a tool box. When placed in a tool box, a slot is generally cut in the cover thereof to allow one of the members of the same to project therethrough. In applicant's device, this inconvenience and difficulty is obviated, as clearly seen in Figs. 3 and 4, applicant's device taking up no more room than an ordinary straight rule.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A mechanic's square comprising two rules connected at one end, normally at right angles to each other and adapted to be folded upon each other; and a spiral spring for retaining said rules at right angles to each other, substantially as described.

2. A mechanic's square comprising two rules fastened together at one end, normally at right angles to each other and adapted to be folded upon each other; a spiral spring for retaining said rules at right angles to each other; and means for retaining said rules in said folded position, substantially as described.

3. A mechanic's square comprising two rules, normally at right angles to each other, pivotally fastened together at one end and adapted to be folded one upon the other; a pair of lugs projecting from said end of each rule; a pin adapted to project through said lugs; and a spiral spring mounted on said pin for retaining said rules normally at right angles to each other, substantially as described.

4. A mechanic's square comprising two rules, each having a diagonally cut end and said rules being fastened together at said diagonally cut ends, normally at right angles to each other and adapted to be folded upon each other; and a spiral spring for retaining said rules normally at right angles to each other, substantially as described.

In testimony whereof I have signed my name to this specification in the presence of two subscribing witnesses.

WILLIAM M. SLAVIK.

Witnesses:
JOSHUA R. H. POTTS,
HELEN F. LILLIS.